(12) United States Patent
Yoshida (10) Patent No.: US 7,173,198 B2
(45) Date of Patent: Feb. 6, 2007

(54) SEAT WEIGHT MEASURING APPARATUS

(75) Inventor: Tetsuo Yoshida, Utsunomiya (JP)

(73) Assignee: Takata Corporation, Tokyo (JP)

( * ) Notice: Subject to any disclaimer, the term of this patent is extended or adjusted under 35 U.S.C. 154(b) by 221 days.

(21) Appl. No.: 10/880,593

(22) Filed: Jul. 1, 2004

(65) Prior Publication Data
US 2005/0023045 A1 Feb. 3, 2005

(30) Foreign Application Priority Data
Jul. 31, 2003 (JP) ............................. 2003-283409

(51) Int. Cl.
*G01G 19/52* (2006.01)
(52) U.S. Cl. ..................... 177/144; 280/735; 180/273
(58) Field of Classification Search ................ 177/144; 180/273; 280/735
See application file for complete search history.

(56) References Cited

U.S. PATENT DOCUMENTS

| 6,571,647 B1 | 6/2003 | Aoki et al. |
| 2003/0111276 A1 | 6/2003 | Kajiyama |

*Primary Examiner*—Randy W. Gibson
*Assistant Examiner*—Sean Kayes
(74) *Attorney, Agent, or Firm*—Foley & Lardner, LLP

(57) ABSTRACT

A seat weight measuring apparatus capable of securely withstanding large force due to large load, such as force in the event of a vehicle collision, applied to a vehicle seat. Normally, a small force is applied to a rear pin bracket and the sleeves through which a pivot bolt is inserted do not substantially collide with the inner peripheries of holes. As a large force is applied to the rear pin bracket, a stopper bolt collides with a base frame and the rear pin bracket collides with the pivot bolt. The large force exerted on the rear pin bracket is shared and borne by portions of the frame thereby reducing the localized stresses in the frame.

15 Claims, 6 Drawing Sheets

SEAT WEIGHT MEASURING APPARATUS

BACKGROUND OF THE INVENTION

The present invention pertains to a technical field of a seat weight measuring apparatus for measuring the weight of a seat for a vehicle such as an automobile including load applied to the seat.

As a seat weight measuring apparatus, there has been conventionally proposed a seat weight measuring apparatus comprising a force input member to which force due to the weight of a seat for a vehicle such as an automobile including load applied to the seat is applied and which transmits the force to a sensor portion such as, for example, Japanese Patent Publication No. 2000-258234 (hereby incorporated by reference herein in its entirety).

Figure 5A:
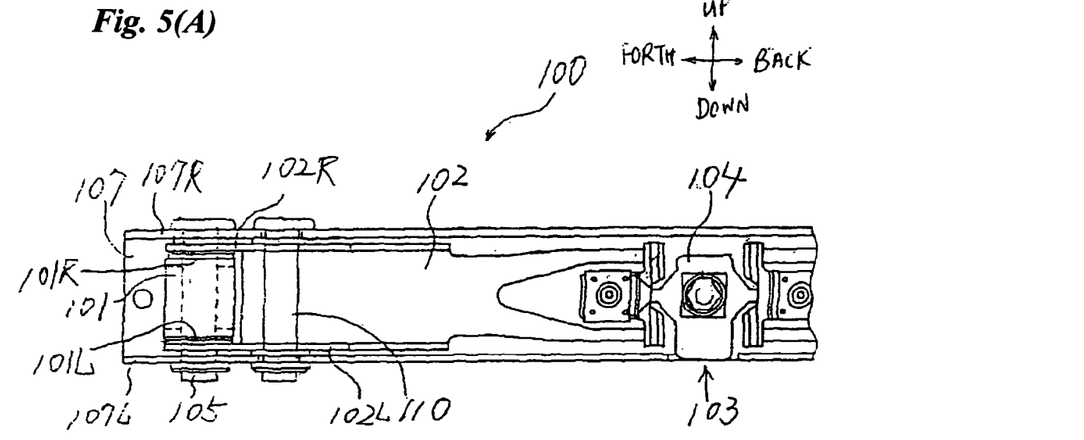
FIG. 5(A) is a plan view.
Figure 5B:
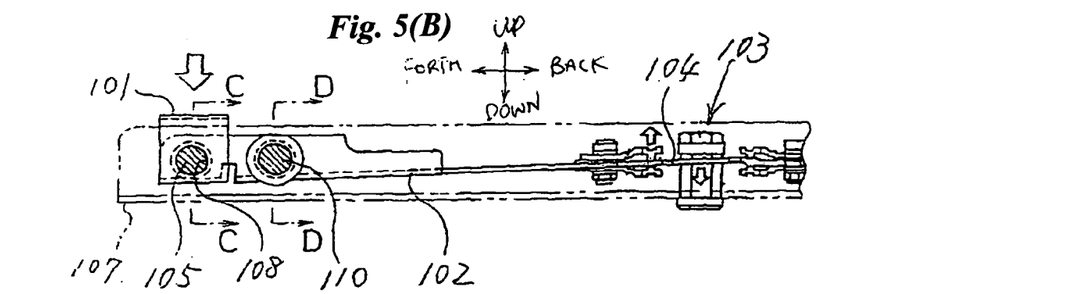
FIG. 5(B) is a front view.
Figure 5C:
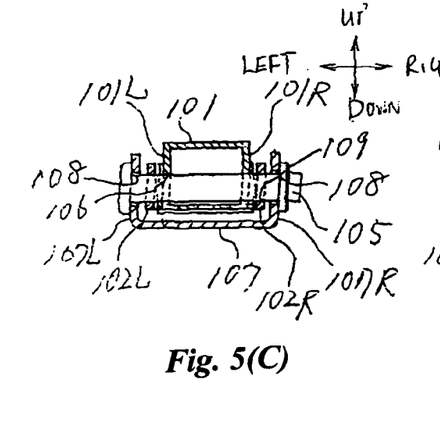
FIG. 5(C) is a sectional view taken along a line C—C of FIG. 5(B)
Figure 5D:
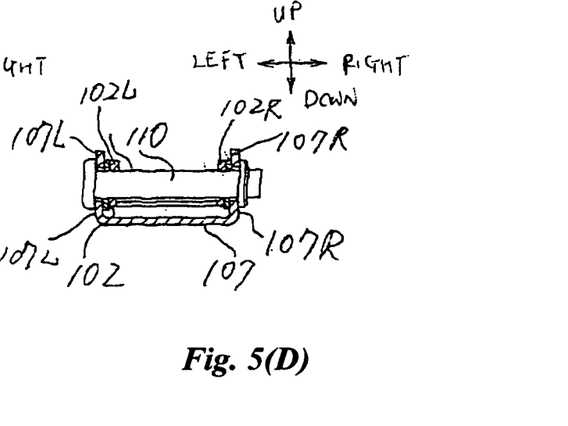
FIG. 5(D) is a sectional view taken along a line D—D of FIG. 5(B).

As shown in FIGS. 5(A) and 5(B), a seat weight measuring apparatus 100 disclosed in Japanese Patent Publication No. 2000-2582341 has a pin bracket 101 as the force input member. As force due to the seat weight is applied to the pin bracket 101, the pin bracket 101 transmits this force to a sensor plate 104 of a sensor portion 103 through an arm 102. Thus, the sensor plate 104 is distorted. The distortion is detected by a strain gauge (not shown) mounted on the sensor plate 104, thereby measuring the seat weight of the vehicle seat on which the occupant sits.

By the way, as shown in FIGS. 6(A) through 6(D), in the seat weight measuring apparatus 100, a stopper bolt 105 extends through holes 106 of left and right side walls 101L, 101R of the pin bracket 101 and also extends through elongate holes 108, which are elongate in the vertical direction, formed in left and right side walls 107L, 107R of the base frame 107 and through holes 109 formed in side walls 102L, 102R of the arm 102. The arm 102 is pivotally supported to the side walls 107L, 107R of the base frame 107 by a pivot bolt 110.

Figure 6A:
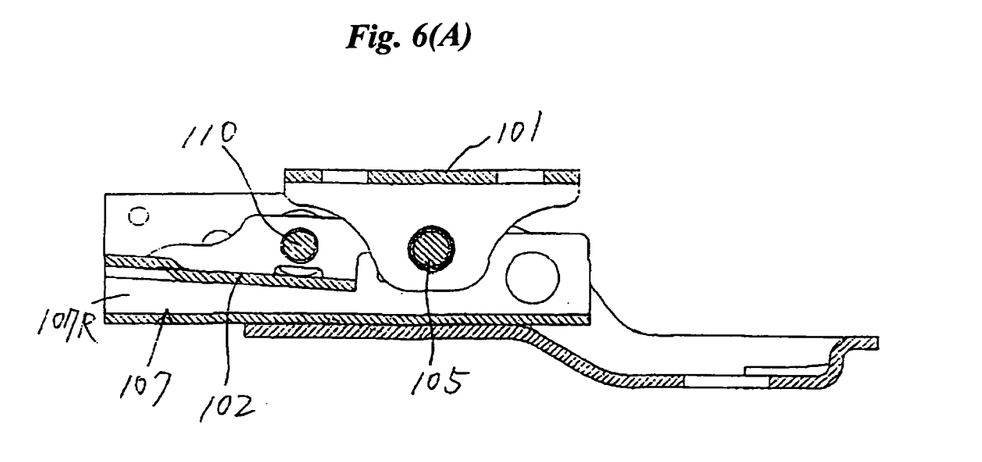

As shown in FIG. 6(A), as vertical force F is applied to the pin bracket 101 in the normal state, the stopper bolt 105 most always moves within the elongate holes 108 because the force F is in a normal level so that the force F is seldom or never transmitted to the side walls 107A of the base frame 107. Even when the stopper bolt 105 collides with upper or lower edges of the inner peripheries of the elongate holes 108, force acting on the side walls 107A of the base frame 107 is small because the force F is in a normal level. By the vertical movement of the stopper bolt 105, the arm 102 pivots about the pivot bolt 105 so that the force F (that is, the seat weight) is detected by the sensor portion.

Figure 6B:
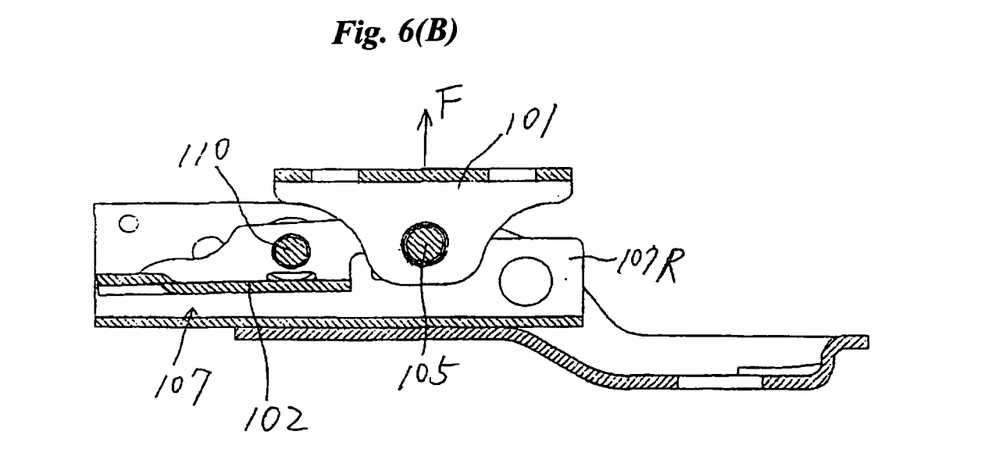

In the event of a vehicle collision or the like, a large load is generated on the vehicle seat so that large force F is applied upwardly to the pin bracket 101. To withstand the large force F, the pin bracket 101 is required to have enough large strength. That is, as shown in FIG. 6(B), when such large force F significantly larger than that in the normal state is applied upwardly to the pin bracket 101, the stopper bolt 105 widely moves upwardly so as to collide with the upper edges of the inner peripheries of the elongate holes 108, thereby pressing the side walls 107A of the base frame 107. Because of the reaction force, the stopper bolt 105 presses the side walls 101A of the pin bracket 101. Accordingly, large stress is generated at portions α lower than the holes 106 of the side walls 101A of the pin bracket 101. Therefore, the portions of the side walls 101A of the pin bracket 101 are required to have large strength to withstand to the stress.

To increase the strength of the portions α of the side walls 101A, it can be considered to increase the vertical length of the portions from the holes 106 to the lower edges of the side walls 101A of the pin bracket 101 or increase the thickness of the side walls 101A.

However, the increase in length of the portions α of the side walls 101A increases the height of the pin bracket 101 and the increase in thickness of the side walls 101A increases the weight and the width of the pin bracket 101. The increase in size of the seat weight measuring apparatus 100 leads to restriction on the layout, thus causing a problem of reducing the degree of installation freedom.

As another way of coping with large stress produced on the portions α lower than the holes 106 of the side walls 101A of the pin bracket 101, it can be considered to provide a force bearing member such as a bolt exclusively for bearing the force, wherein the force bearing member penetrates the wide walls 107A of the base frame 107 and the side walls 101A of the pin bracket 101 to bear the force. Therefore, the large force F applied to the pin bracket 101 is shared and borne by the stopper bolt 105 and the force bearing member, thereby reducing the stress developed on the portions α of the side walls 101A.

However, the way of providing the force bearing member for single purpose also has problems not only increasing the number of parts but also increasing the entire length of the base frame 107.

The present invention was made for under the aforementioned circumstances and an object of the present invention is to provide a seat weight measuring apparatus capable of further securely withstanding large force due to large load, such as force in the event of a vehicle collision, applied to a vehicle seat, without increase in number of parts and increase in size of the apparatus.

SUMMARY

According to an embodiment of the present invention, a seat weight measuring apparatus comprises a base frame, a sensor portion which is mounted on the base frame to detect load applied to a vehicle seat, a force input member to which force due to the load applied to said vehicle seat is applied, and an arm which is pivotally connected to the force input member by a first shaft and is pivotally supported to said base frame by a second shaft to transmit the force transmitted from said force input member to said sensor portion, and further comprises a force sharing means which, in the normal state, does not allow the collision of said first shaft with said base frame and the collision of said force input member with said second shaft and, when force larger than that in the normal state is applied to said force input member, allows the collision of said first shaft with said base frame and the collision of said force input member with said second shaft.

According to another embodiment of the present invention, the base frame and the force input member are each formed in a U-like configuration having left and right side walls and that said first shaft moves relative to the side walls of said base frame more widely than the normal state so as to collides with the side walls of said base frame and the second shaft moves relative to the side walls of said force input member more widely than the normal state so as to collides with the side walls of said force input member when force larger than that in the normal state is applied to said force input member.

According to embodiments of the present invention, when a force larger than that in the normal state is applied to the force input member, the first shaft is brought to collide with the base frame and the force input member is brought to collide with the second shaft by the force sharing means. Therefore, the large force is shared and borne by two portions, i.e. the first shaft portion and the second shaft portion, thereby reducing the stress generated at the force input member even when the force exerted on the force input member is larger than that in the normal state.

As a result of this, the force input member securely bears the large force without increasing the strength of the force input member by increasing the size of the force input member and/or the thickness of the force input member. In addition, there is no necessary to increase the strength of the force input member, thereby preventing the size and the weight of the seat weight measuring apparatus from being increased, alleviating the limitation on layout, and increasing the degree of installation freedom.

Since there is no necessary to use a special part such as a force bearing member for bearing large force as mentioned above, the increase in the number of parts can be prevented.

According to an embodiment of the invention, though the lengths of the side walls are slightly increased because portions for bearing the first shaft and the second shaft are additionally formed in the left and right side walls of the force input member, the increase in the lengths of the side walls can be absorbed in the base frame. Therefore, the entire length of the base frame, that is, the entire length of the seat weight measuring apparatus is prevented from being increased.

In addition, since there is no necessity to substantially change the design of conventional parts, except a slight change of design of the side walls of the force input member for bearing the first shaft and the second shaft, the increase in cost can also be prevented.

According to another embodiment of the invention, an occupant detection device comprises a base frame, a sensor portion which is mounted on the base frame to detect load applied to a vehicle seat, a force input member to which force due to the load applied to said vehicle seat is applied, an arm which is pivotally connected to the force input member by a first shaft and is pivotally supported to said base frame by a second shaft to transmit the force transmitted from said force input member to said sensor portion, and a force sharing means which, in the normal state, does not allow the collision of said first shaft with said base frame and the collision of said force input member with said second shaft and, when force larger than that in the normal state is applied to said force input member, allows the collision of said first shaft with said base frame and the collision of said force input member with said second shaft.

According to another embodiment of the present invention, an occupant detection device comprises a base frame, a sensor portion, a force input member, and an arm configured to transmit force from said force input member to the sensor portion. The arm is connect to the force input member by a stopper bolt; and the arm is connected to the base frame by a pivot bolt. The device is configured so that the stopper bolt, elongate holes, holes of the force input member and the pivot bolt share the force exerted on the force input member.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIGS. 3(A), and 3(B) show a portion, where a rear pin bracket is mounted, of the seat weight measuring apparatus, wherein FIG. 3(A) is an illustration showing the normal state and FIG. 3(B) is an illustration showing a state when large load is developed.

FIGS. 4(a), and 4(b) schematically show the arrangement of a rear pin bracket of another embodiment of the seat weight measuring apparatus, wherein FIG. 4(A) is an illustration showing the normal state and FIG. 4(B) is an illustration showing the state that large load is generated.

FIGS. 5(A)–5(D) partially show the seat weight measuring apparatus disclosed in Japanese Patent Publication No. 2000-258234, wherein

FIGS. 6(A), 6(B) schematically show a portion, where a rear pin bracket is mounted, of the conventional seat weight measuring apparatus, wherein FIG. 6(A) is an illustration showing the normal state and FIG. 6(B) is an illustration showing a state when large load is developed.

DETAILED DESCRIPTION

Hereinafter, embodiments of the present invention will be described with reference to the attached drawings. In the entire description, the forward, backward, leftward, rightward, upward, and downward directions correspond to the forward, backward, leftward, rightward, upward, and downward directions of a vehicle.

Figure 1:
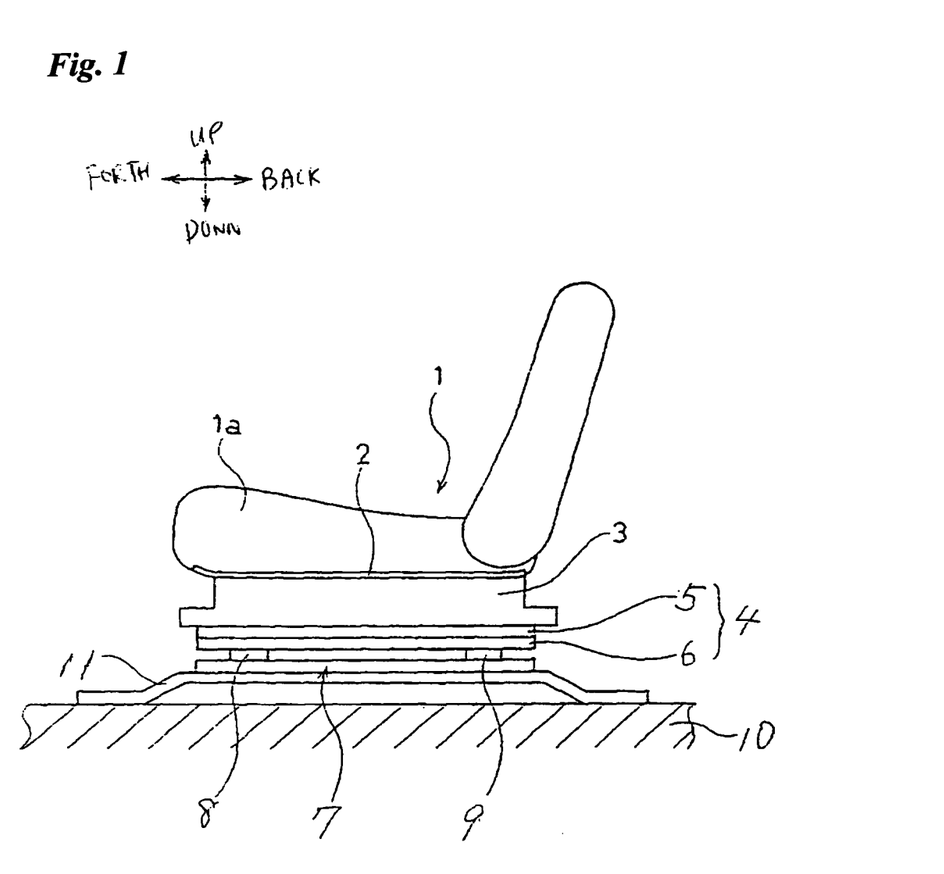
FIG. 1 is an illustration schematically showing a state that a seat weight measuring apparatus according to an embodiment of the present invention.

As shown in FIG. 1, a vehicle seat 1 has a seat cushion 1a on which an occupant can sits, and a seat pan 2 made of a steel sheet which is disposed beneath the seat cushion 1a to entirely cover the bottom surface of the seat cushion 1a. Under the seat pan 2, a pair of side frames 3 (only one of the side frames is shown in FIG. 1) extend downwardly from the seat pan 2 and are spaced apart from each other at a predetermined distance in the lateral (left-to-right) direction of the vehicle. Each side frame 3 is disposed to extend in the longitudinal (front-to-rear) direction of the vehicle.

Disposed on the lower ends of the side frames 3 are seat rails 4 (only one of the seat rails is shown in FIG. 1), respectively. Each seat rail 4 is a combination of an upper rail 5 which is fixed to the lower end of the side frame 3 and a lower rail 6 which is arranged to be slidable relative to the upper rail 5 in the longitudinal direction of the vehicle. Therefore, the seat rails are provided for guiding the vehicle seat 1 slidably in the longitudinal direction of the vehicle.

Each of seat weight measuring apparatuses 7 (only one of the seat weight measuring apparatuses 7 is shown in FIG. 1) is disposed under the corresponding lower rail 6 via a pair of front and rear pin brackets 8, 9 or force input members extending in the lateral direction of the vehicle. These seat weight measuring apparatuses 7 are fixed to seat brackets 11 (only one of the seat brackets is shown in FIG. 1) which are secured to a vehicle floor 10 and spaced apart from each other at a predetermined distance in the lateral direction of the vehicle. Since the seat brackets 11 are secured to the vehicle body, the vehicle seat 1 can be stably supported to the vehicle body, thereby achieving further precise detection of the load of the vehicle seat 1 by the seat weight measuring apparatuses 7.

It should be noted that the seat weight measuring apparatuses 7 may be directly fixed to the vehicle floor 10, without using the seat brackets 11. The seat weight measuring apparatuses 7 may be disposed between the side frames 3 and the upper rails 5 of the seat rails 4.

Figure 2:
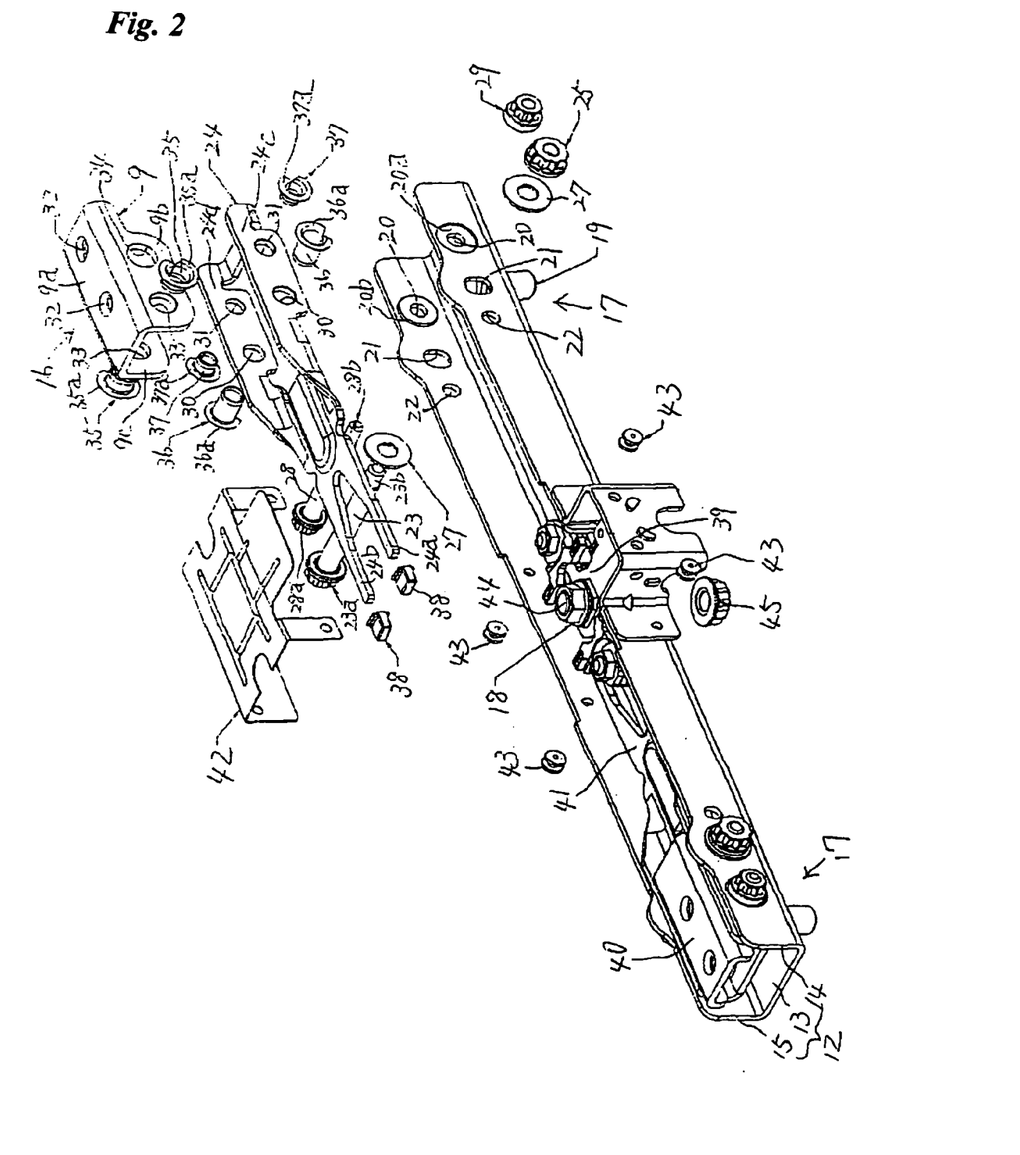
FIG. 2 is an exploded perspective view partially and schematically showing the best mode for carrying out the seat weight measuring apparatus according to an embodiment of the invention.

As shown in FIG. 2, the seat weight measuring apparatus 7 comprises a base frame 12 which extends in the longitudinal direction of the vehicle. The base frame 12 is composed of a base bottom 13 and base side walls 14, 15 such that the base frame 12 is formed to have an upward U-like cross section (to have an open top). The base frame 12 is provided near the front and rear ends thereof with mounting portions 16, 17 relative to the lower rail 6 of the seat rail 4 and to the seat bracket 11. In addition, the base frame 12 is provided at its center with a sensor portion 18.

Figure 3A:
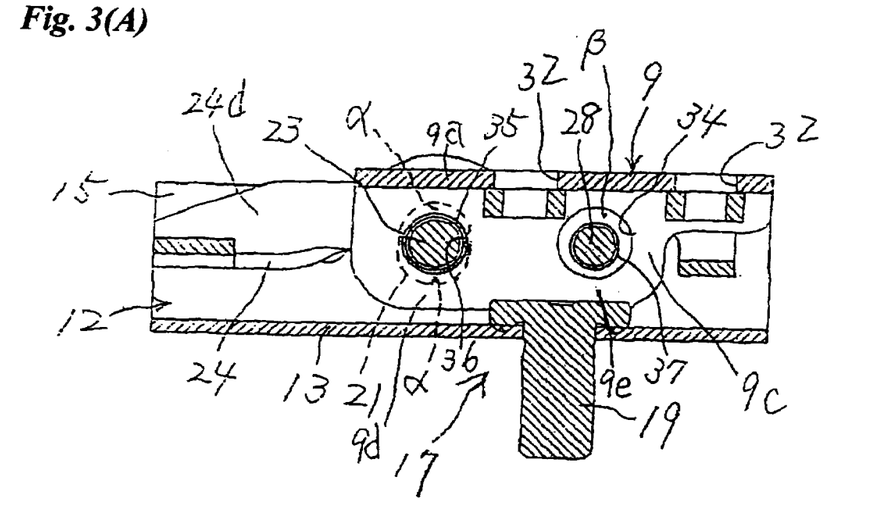

The mounting portion 17 near the rear end of the base frame 12 is provided with a mounting bolt 19 for fixing the base frame 12 to the seat bracket 11. As shown in FIG. 3(A), the mounting bolt 19 is welded to the base bottom 13 of the base frame 12. As shown in FIG. 2, the mounting portion 17 is provided with pivot holes 20, elongate holes 21, and small apertures 22 which are formed in rear end portions of the left and right base side walls 14, 15, respectively to correspond to those of the other base side wall 15, 14. The pivot holes 20, the elongate holes 21, and the small apertures 22 are arranged in this order from the rear end of the base frame 12 to the sensor portion 18.

Figure 3B:
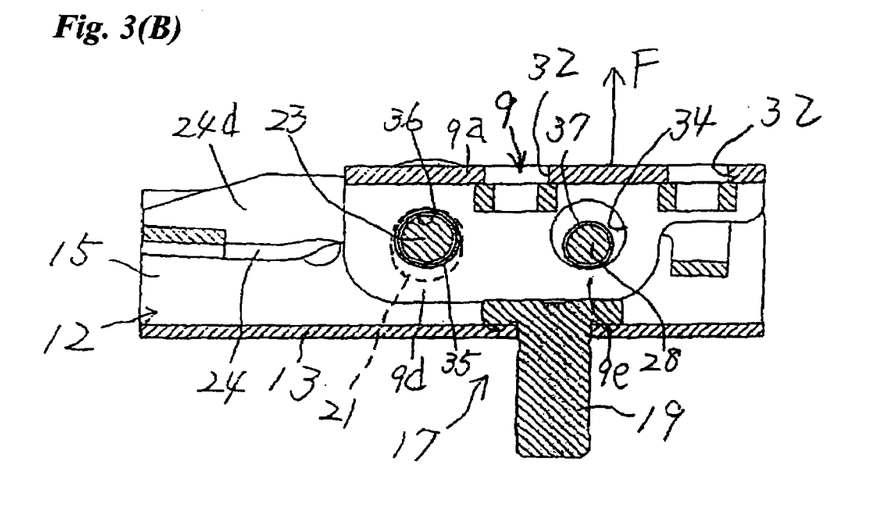

The elongate holes 21 are long in the vertical direction. As shown in FIG. 2 and FIGS. 3(A), 3(B), a stopper bolt 23 (i.e., a first shaft) is inserted through the elongate holes 21. The stopper bolt 23 is a pivot pin which pivotally supports a rear pin bracket 9 and an arm 24 and connecting them and which transmits force due to the seat load to the arm 24 as will be described later. The stopper bolt 23 is provided at one end with a hexagon head 23a, at the other end with a threaded portion 23b, and at the middle with a smooth cylindrical surface. The stopper bolt 23 is inserted through the elongate holes 21 and is attached to the rear end portions of the left and right base side walls 14, 15 by screwing a stopper nut 25 onto the threaded portion 23b such that the stopper bolt 23 is slidable in the vertical direction within the elongate holes 21. A stopper washer 27 is sandwiched between the hexagon head 23a and the right base side wall 15 and another stopper washer 27 is sandwiched between the stopper nut 25 and the left base side wall 14.

As shown in FIGS. 3(A), 3(B), there are gaps a between the outer periphery of the stopper bolt 23 and the inner peripheries of the elongate holes 21 in the assembled state so that the stopper bolt 23 is normally prevented from touching the upper and lower edges of the inner peripheries of the elongate holes 21. When excessive load as mentioned above is applied to the vehicle seat 1 so that the rear pin bracket 9 is raised upwardly as mentioned above, the stopper bolt 23 is raised so as to collide with the upper edges of the inner peripheries of the elongate holes 21 as shown in FIG. 3(B). Therefore, the excessive load is transmitted directly from the rear pin bracket 9 to the base side walls 14, 15 of the base frame 12. In this case, the load does not act on a load sensor 51 of the sensor portion 18. Also when the rear pin bracket 9 is depressed because of forces applied to the seat belt, the stopper bolt 23 is lowered and thus collides with the upper edges of the inner peripheries of the elongate holes 21 so as to exhibit the same works.

As shown in FIG. 2, formed around the pivot holes 20 are annular counter bores 20a formed in outer surfaces of the base side walls 14, 15 and annular convexities 20b formed in the inner surfaces of the base side walls 14, 15. Inserted into the pivot holes 20 is the pivot bolt (i.e., pivot pin or second shaft) 28. The pivot bolt 28 is a pivot pin for supporting the arm 24 such that the arm 24 is pivotable relative to the base frame 12. When force due to the seat load is applied to the arm 24 from the rear pin bracket 9 via the stopper bolt 23, the arm 24 pivots about the pivot bolt 28. The pivot bolt 28 is provided at one end with a hexagon head 28a, at the other end with a threaded portion 28b, and at the middle with a smooth cylindrical surface. The pivot bolt 28 is inserted through the pivot holes 20 and is then attached to the base side walls 14, 15 by screwing a pivot nut 29 onto the threaded portion 28b of the pivot bolt 28.

The small apertures 22 formed adjacent to the elongate holes 21 are service windows for observation of the assembling state.

At the rear-side mounting portion 17, the arm 24 is arranged inside the base frame 12. The arm 24 has a portion on the front side from the middle portion (i.e. on the sensor portion 18 side), which is forked into two plate-shape branches 24a, 24b. The arm 24 has a portion on the rear side, where arm side walls 24c, 24d are formed to stand upwardly from the left and right edges. Each of the arm side walls 24c, 24d is provided with two holes 30, 31 such that the respective holes 30, 31 of the arm side walls 24c, 24d are aligned to face each other. The arm 24 is assembled between the base side walls 14, 15 to extend along the inner surfaces of the base side walls 14, 15. There are gaps between the left arm side wall 24c and the base side wall 14 and between the right arm side wall 24d and the base side wall 15.

The rear pin bracket 9 comprises an upper flat top 9a and side walls 9b, 9c downwardly extending from the left and right edges of the flat top 9a so that the flat top 9a and the side walls 9b, 9c form a downward U-like cross section. The flat top 9a is provided with two holes 32. The lower rail 6 of the seat rail 4 is disposed on the upper surface of the flat top 9a and fasteners (not shown) such as bolts or rivets are inserted into the holes 32 and corresponding holes (not shown) of the lower rail 6, thereby fixing the rear pin bracket 9 to the lower rail 6.

The left and right side walls 9b, 9c of the rear pin bracket 9 are each formed in a substantially rectangular shape. Each of the side walls 9b, 9c is provided with two holes 33, 34 such that the respective holes 33, 34 of the side walls 9b, 9c are aligned to face each other. One of the holes 33 is located at a position corresponding to the elongate hole 21 of each of the base side walls 14, 15 and the hole 30 of each of the arm side walls 24c, 24d. The other hole 34 is located at a position corresponding to the pivot hole 20 of each of the base side walls 14, 15 and the hole 31 of each of the arm side walls 24c, 24d.

The rear pin bracket 9 is assembled between the arm side walls 24c, 24d to extend along the inner surfaces of the arm side walls 24c, 24d. There are gaps between the left side wall 9b and the arm side wall 24c and between the right side wall 9c and the arm side wall 24d.

In a state that the arm 24 and the rear pin bracket 9 are assembled in the base frame 12, sleeves 35 are inserted into the left and right holes 33 of the rear pin bracket 9, respectively and flanges 35a, 35a of the sleeves 35 are located in the gaps between the both side walls 9b, 9c and the both arm side walls 24c, 24d, respectively. In addition, sleeves 36 are inserted into the holes 30 of the both arm side walls 24c, 24d, respectively and also into the sleeves 35, respectively. The flanges 36a, 36s of the sleeves 36 are located in the gaps between the both base side walls 14, 15 and the both arm side walls 24c, 24d, respectively. Further, sleeves 37 are inserted into the holes 31 of the both arm side walls 24c, 24d and into the right and left holes 34 of the rear pin bracket 9. The outer diameter of the sleeve 37 is set to be smaller than the inner diameter of the hole 32. The flanges 37a, 37a of the sleeves 37 are located in the gaps between the both base side walls 14, 15 and the both arm side walls 24c, 24d.

The stopper bolt 23 is inserted into the elongate holes 21 of the both base side walls 14, 15 and the sleeves 36 and the stopper nut 25 is screwed onto the threaded portion 23b of the stopper bolt 23, whereby the arm 24 is pivotally mounted to the base frame 12 such that the stopper bolt 23 can move vertically within the elongate holes 21. In addition, the pivot bolt 28 is inserted into the pivot holes 20 of the both base side walls 14, 15 and the sleeves 37 and the pivot nut 29 is screwed onto the threaded portion 28b of the pivot bolt 28, whereby the arm 24 is pivotally mounted to the base frame 12.

As force due to the seat load is exerted on the rear pin bracket 9 in the state that the arm 24 and the rear pin bracket 9 are assembled to the base frame 12, the force is transmitted to the arm 24 from the rear pin bracket 9 through the stopper bolt 23 so that the arm 24 pivots about the pivot bolt 28.

The branches 24a, 24b of the arm 24 are covered by caps 38. The arm 24 is adapted to transmit the transmitted force due to the seat load to the sensor plate 39 of the sensor portion 18 through the caps 38. The sensor plate 39 is adapted to be distorted by the transmitted force. The distortion of the sensor plate 39, i.e. the seat load is detected by strain gauges (not shown) mounted on the sensor plate 39. The structure of transmitting force from the branches 24a, 24b to the sensor plate 39 and the method of detecting the seat load by the sensor plate 39 are the same as those disclosed in the aforementioned Japanese Patent Publication No. 2000-258234.

Since the outer diameter of the sleeve 37 is set to be smaller than the inner diameter of the hole 34 of the rear pin bracket 9, the outer periphery of the sleeve 37 through which the pivot bolt 28 is inserted does not touch the inner periphery of the hole 34 so as to form a gap β between the outer periphery and the inner periphery. In addition, the outer periphery of the sleeve 36 through which the stopper bolt 23 is inserted does not touch the upper and lower edges of the inner periphery of the elongate hole 31 so as to form gaps a between the outer periphery and the upper and lower edges. In the normal state, as force due to the seat load is applied to the rear pin bracket 9, the outer periphery of the sleeve 35 does not collide with the inner peripheries of the holes 32 and the outer periphery of the sleeve 36 also does not collide with the inner peripheries of the elongate holes 31 because the force is relatively small. Therefore, the force due to the seat load is transmitted to the sensor portion 18 via the rear pin bracket 9, the stopper bolt 23, and the arm 24, so that the seat load is measured with accuracy by the sensor portion 18.

In the event of a vehicle collision or the like, large load is generated on the vehicle seat 1. As large force F due to this large load is thus applied upwardly to the pin bracket 9 as shown in FIG. 3(B), the rear pin bracket 9 moves upwardly relative to the base frame 12 more widely than the normal state. Then, the stopper bolt 23 collides with the upper edges of the inner peripheries of the elongate holes 21 of the base frame 12 and the lower edges of the inner peripheries of the holes 34 of the rear pin bracket 9 collide with the outer periphery of the pivot bolt 28. Accordingly, the large force exerted on the rear pin bracket 9 is shared and borne by the portions 9d between the holes 33 and the lower edges of the side walls 9b, 9c and the portions 9e between the holes 34 and the lower edges of the side walls 9b, 9c. Therefore, the stopper bolt 23, the elongate holes 21 of the base frame 12, the holes 34 of the rear pin bracket 9, and the pivot bolt 28 compose an embodiment of a force sharing means.

Also at the front end of the base frame 12, a front pin bracket 40 having the same structure of the rear pin bracket 9 and an arm 41 having the same structure of the arm 24 are provided in the same manner. In this case, the front pin bracket 40 and the arm 41 and the rear pin bracket 9 and the arm 24 are arranged symmetrically in the longitudinal direction.

In FIG. 2, numeral 42 designates a cover for covering and protecting the sensor portion 18. The cover 42 is attached to the base frame 12 by four fasteners 43 such as rivets. Further, numerals 44 and 45 designate a bolt and nut for mounting the sensor portion 18 to the base frame 12.

Other structures and other works and effects of the seat weight measuring apparatus 1 of this embodiment are substantially the same as the seat weight measuring apparatus disclosed in the aforementioned Japanese Patent Publication No. 2000-258234.

According to the seat weight measuring apparatus 1 of this embodiment, the large force exerted on the rear pin bracket 9 is shared and borne by the two portions 9d, 9e as mentioned above, thereby reducing the stress generated at each of the portions 9d, 9e. Even when such large force is exerted on the rear pin bracket 9, the rear pin bracket 9 securely bears the large force without increasing the lengths (the heights) of the aforementioned portions 9d, 9e in the vertical direction nor increasing the thickness of the side walls 9b, 9c of the rear pin bracket 9. The lengths of the side walls 9b, 9c are slightly increased because of the two holes 33, 34 additionally formed in the left and right side walls 9b, 9c of the rear pin bracket 9. However, since the increase in the lengths of the side walls 9b, 9c can be absorbed in the base frame 12, the entire length of the base frame 12, that is, the entire length of the seat weight measuring apparatus is prevented from being increased. Therefore, this can prevent the size and the weight of the seat weight measuring apparatus 7 from being increased, alleviate the limitation on layout, and increase the degree of installation freedom.

Since there is no necessity to use a special part such as a force bearing member for bearing large force as mentioned above, the increase in the number of parts can be prevented. In addition, since there is no necessary to substantially change the design of conventional parts, except a slight change of design of the side walls 9b, 9c, the increase in cost can also be prevented.

Figure 4A:
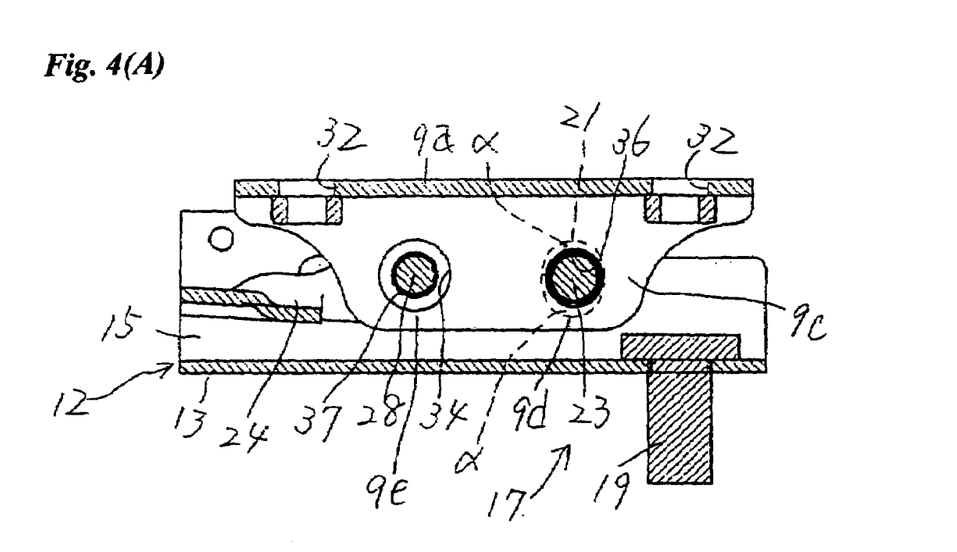
Figure 4B:
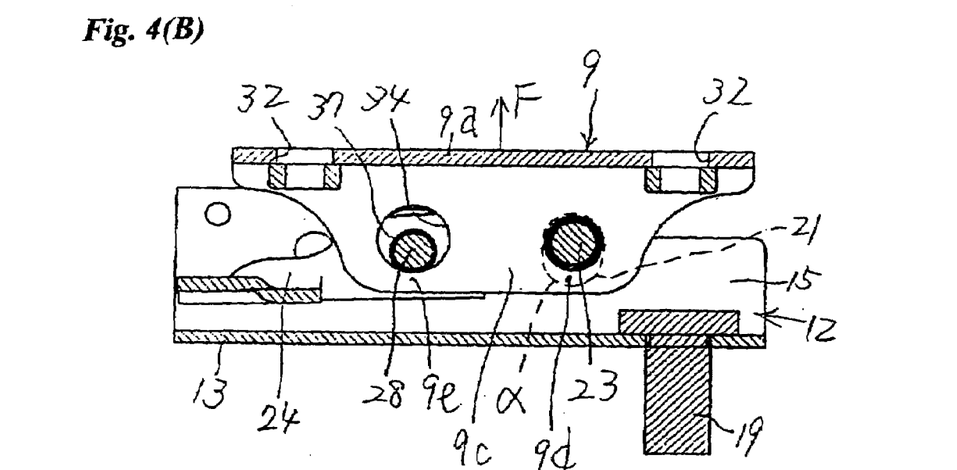

FIGS. 4(A), 4(B) are illustrations similar to FIGS. 3(A), 3(B), but showing another example of arrangement of the rear pin bracket in the seat weight measuring apparatus of the present invention. The same components as those of the aforementioned example are marked with the same numerals so that the detailed description of such components will be omitted.

In the aforementioned embodiment, the pivot holes 20 and the elongate holes 21, that is, the stopper bolt 23 and the pivot bolt 28 are arranged in this order from the rear end of the base frame 12 to the sensor portion 18. In this embodiment, however, contrary to the aforementioned embodiment, elongate holes 21 and pivot holes 20, that is, the pivot bolt 28 and the stopper bolt 23 are arranged in this order from the rear end of the base frame 12 to the sensor portion 18 as shown in FIGS. 4(A) and 4(B).

Other structures of the seat weight measuring apparatus of this embodiment are the same as those of the aforementioned embodiment. The works and effects of the seat weight measuring apparatus 1 of this embodiment are generally the same as those of the aforementioned embodiment.

Though the arm 24, 61F is forked into the branches 24a, 24b and the force is transmitted to the sensor plate 39 through two action portions of the branches 24a, 24b in the aforementioned embodiments, the arm 24, 61F may not be formed into two branches 24a, 24b so that the force is transmitted to the sensor plate 39 through one action portion.

The sleeves 36, 72, 37 are not inevitable so that the sleeves 36, 72, 37 may be omitted.

The seat weight measuring apparatus 7 may be arranged between the side frame 3 of the vehicle seat 1 and the upper rail 5 of the seat rail 4.

A seat weight measuring apparatus of and embodiment of the present invention is installed to a seat for a vehicle such as an automobile and can be suitably used for various devices to be controlled according to the seat load of the vehicle, such as a seat belt device for restraining and protecting an occupant according to the seat load.

Japanese Patent Application No. 2003-283409 is incorporated herein by reference in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A seat weight measuring apparatus comprising:
   a base frame;
   a sensor portion which is mounted on the base frame to detect load applied to a vehicle seat;
   a force input member to which force due to the load applied to said vehicle seat is applied;
   an arm which is pivotally connected to the force input member by a first shaft and is pivotally supported to said base frame by a second shaft to transmit the force transmitted from said force input member to said sensor portion; and
   a force sharing mechanism which, in the normal state, does not allow the collision of said first shaft with said base frame and the collision of said force input member with said second shaft and, when force larger than that in the normal state is applied to said force input member, allows the collision of said first shaft with said base frame and the collision of said force input member with said second shaft, and wherein the force sharing mechanism includes only the first and second shafts.

2. The seat weight measuring apparatus of claim 1, wherein the first shaft is a stopper bolt and the second shaft is a pivot pin.

3. The seat weight measuring apparatus of claim 1, wherein the base frame and said force input member are each formed in a U-like configuration having left and right side walls, and that said first shaft moves relative to the side walls of said base frame more widely than the normal state so as to collides with the side walls of said base frame and the second shaft moves relative to the side walls of said force input member more widely than the normal state so as to collides with the side walls of said force input member when force larger than that in the normal state is applied to said force input member.

4. A seat weight measuring device comprising:
   a base frame;
   a sensor portion;
   a force input member;
   an arm configured to transmit force from said force input member to the sensor portion;
   wherein the arm is connect to the force input member by a stopper bolt;
   wherein the arm is connected to the base frame by a pivot bolt;
   wherein the base frame includes an elongated hole for receiving the stopper bolt and a pivot hole for receiving the pivot bolt, the pivot hole located toward a rear end of the base frame and the elongated hole located inwards of the pivot hole; and
   wherein the device is configured so that the stopper bolt, elongated hole, pivot hole and the pivot bolt share the force exerted on the force input member.

5. The seat weight measuring device of claim 4, wherein the arm is positioned inside the base frame.

6. A vehicle seat comprising:
   a seat weight measuring device comprising:
      a base frame;
      a force input member;
      first and second shaft members configured to connect an arm to the force input member and the base frame; and
   wherein when a normal force is exerted on the seat, the first shaft and the second shaft remain stationary;
   wherein the base frame includes an elongated hole for receiving the first bolt and a pivot hole for receiving the second bolt, the pivot hole located toward a rear end of the base frame and the elongated hole located inwards of the pivot hole.

7. The vehicle seat of claim 6, wherein when a large force is exerted on the seat, the first shaft collides with the base frame.

8. The vehicle seat of claim 6, wherein when a large force is exerted on the seat, the second shaft collides with the force input member.

9. The vehicle seat of claim 6, wherein the base frame and the force input member are formed in a U-like configuration.

10. An occupant detection device comprising:
    a base frame;
    a sensor portion which is mounted on the base frame to detect load applied to a vehicle seat;
    a force input member to which force due to the load applied to said vehicle seat is applied;
    an arm which is pivotally connected to the force input member by a first shaft and is pivotally supported to said base frame by a second shaft to transmit the force transmitted from said force input member to said sensor portion; and
    a force sharing mechanism which, in the normal state, does not allow the collision of said first shaft with said base frame and the collision of said force input member with said second shaft and, when force larger than that in the normal state is applied to said force input member, allows the collision of said first shaft with said base frame and the collision of said force input member with said second shaft, and wherein the force sharing mechanism includes only the first and second shafts.

11. The occupant detection device of claim 10, wherein the base frame and said force input member are each formed in a U-like configuration having left and right side walls, and that said first shaft moves relative to the side walls of said base frame more widely than the normal state so as to collides with the side walls of said base frame and the second shaft moves relative to the side walls of said force input member more widely than the normal state so as to collides with the side walls of said force input member when force larger than that in the normal state is applied to said force input member.

12. An occupant detection device comprising:
a base frame;
a sensor portion;
a force input member;
an arm configured to transmit force from said force input member to the sensor portion;
wherein the arm is connect to the force input member by a stopper bolt;
wherein the arm is connected to the base frame by a pivot bolt;
wherein the base frame includes an elongated hole for receiving the stopper bolt and a pivot hole for receiving the pivot bolt, the pivot hole located toward a rear end of the base frame and the elongated hole located inwards of the pivot hole; and wherein the device is configured so that the stopper bolt, elongated hole, pivot hole and the pivot bolt share the force exerted on the force input member.

13. The occupant detection device of claim 12, wherein the arm is positioned inside the base frame.

14. The occupant detection device of claim 10, wherein the first shaft is a stopper bolt and the second shaft is a pivot pin.

15. An occupant protection device comprising:
a base frame,
a sensor portion,
a force input member,
an arm configured to transmit force from said force input member to the sensor portion, and
a force sharing mechanism,
wherein the arm is connected to the force input member by a stopper bolt, the base frame including an elongated hole to receive the stopper bolt,
wherein the force sharing mechanism includes a pivot bolt and a pivot hole, the pivot bolt and pivot hole pivotally connect the arm to the base frame, and
wherein the pivot hole is located at a rear end of the base frame such that the elongated hole is located inwards of the pivot hole.

* * * * *